3,541,804
FRACTIONAL CRYSTALLIZATION WITH AN IMMISCIBLE REFRIGERANT
Herbert Fredrick Wiegandt, Ithaca, N.Y., and Regis Lafay, Suresnes, Hauts-de-Seine, France, assignors to Institut Francais du Petrole, des Carburants et Lubrifiants, Rueil-Malmaison, Hauts-de-Seine, France
Filed Oct. 7, 1966, Ser. No. 585,126
Claims priority, application France, Oct. 8, 1965, 34,363
Int. Cl. B01d 9/04
U.S. Cl. 62—58                                                       9 Claims

ABSTRACT OF THE DISCLOSURE

In the formation and separation of crystals such as p-xylene, from a mixture of liquids, such as xylene isomers, mixed with an immiscible liquid refrigerant, such as brine, the improvement of decanting the immiscible liquid refrigerant from the crystalline product which is itself entrained in a liquid, and thereafter separating the entraining liquid from the crystalline product and recirculating said entrainment liquid in co-current flow with the crystalline product which ascends in a vertical crystallizer.

---

Figure 1:
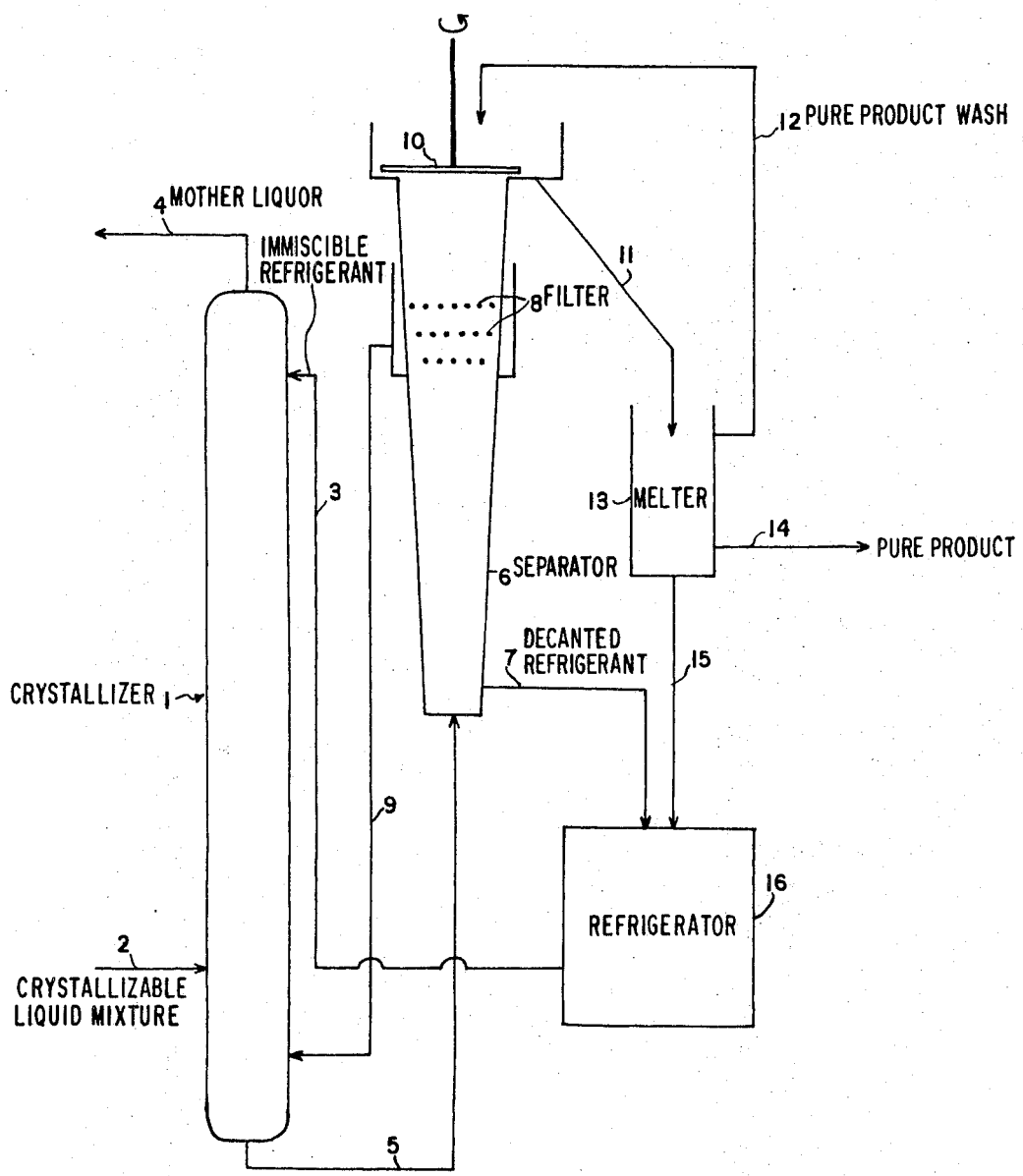

This invention relates generally to the separation of mixtures by crystallization, and particularly to an improvement in the formation and separation of crystals from a mixture of a liquid and an immiscible liquid refrigerant.

Low-temperature crystallization for the separation of close-boiling or azeotropic liquid mixtures is known in the prior art such as disclosed in Kirk-Othmer, "Encyclopedia of Chemical Technology," 2nd edition, vol. 6, pp. 482–515.

It is an object of the present invention to separate liquid mixtures by treating them with an immiscible liquid refrigerant and separating a crystalline product.

Another object of the present invention is a countercurrent flow between the liquid mixture and the immiscible liquid refrigerant.

Still another object of the present invention is a countercurrent flow between the liquid mixture and the crystalline product.

A further object of the invention is the entrainment of the crystalline product in an entrainment liquid.

A still further object of the invention is the recycling of the entrainment liquid countercurrent to the flow of liquid mixture.

It is still another object of the invention to wash the crystalline product and recirculate the washing liquid called reflux concurrent to the flow of liquid mixture.

It is a further object to separate crystals from an entraining liquid which has a lower density than said crystals, in a separating zone of enlarged cross section fed from a narrower pipe at the bottom thereof, without build up of said crystals around said feed pipe and consequently slugging and surging of the bed of crystals.

Upon further study of the specification, drawing and claims, other objects and advantages of the present invention will become apparent.

In a particular embodiment of the present invention one of the constituents of a liquid mixture of substances is selectively crystallized by introducing the mixture into an elongated and substanitally vertical crystallization zone at an intermediate point between the two ends of this crystallization zone, the mixture forming a continuous phase in this zone, and by introducing an immiscible liquid refrigerant. The refrigerant, which is introduced at one end of the crystallization zone, flows in a dispersed form toward the other end in countercurrent relation to the continuous phase and to the reflux liquid hereafter defined; a partial crystallization of the initial mixture is obtained; the crystals formed are carried along in the same direction as the liquid refrigerant and are removed with the refrigerant. The depleted continuous phase flows in the opposite direction for removal at the refrigerant input end of the crystallization zone.

In a particular embodiment of the invention, the crystals produced are carried from the crystallization zone to a separation zone in an entrainment liquid formed substantially of the same constituents as those of the initial mixture, but present in a higher concentration of crystallizable compound. The immiscible liquid refrigerant being withdrawn from the crystallization zone is separated by decantation from the crystals in suspension in the entrainment liquid; and the entrainment liquid is separated by filtration from the crystals in the separation zone. The filtered entrainment liquid is then returned to the crystallization zone at a point between the positions of introduction of the initial mixture and withdrawal of the refrigerant and the crystals, and recirculated at least in part in the direction of flow of the refrigerant. In recirculating the entrainment liquid, the crystals are entrained.

A further specific embodiment of the invention comprises washing the crystals separated in the filtration zone. The separated crystals are washed in countercurrent relation by a washing liquid which is thereafter introduced as "reflux liquid" into the crystallization zone at the same point as the entrainment liquid or at a point between the latter and the feed point for the mixture to be crystallized. The washed crystals are then collected.

The two operations of forming the crystals and separating them are performed in two distinct apparatuses which will be called the "crystallizing" and the "separating" assemblies in the manner described hereinafter, and presenting the following characteristics, reference being made to the attached drawings, wherein flow diagram of the apparatuses for carrying out the invention are shown (FIG. 1).

The crystallizer 1 is substantially a vertical column, preferably cylindrical, in which countercurrent contact is effected between the solution from which the solid crystals are to be formed and the liquid refrigerant which is immiscible in the solution and heavier than the latter. The purpose of the refrigerant is to lower the temperature of the solution down to a point where one of the solutes will crystallize out. The solution enters the crystallizer 1 by conduit 2 and the immiscible refrigerant enters by conduit 3.

The mother liquor, impoverished in one of its constituents (namely that which has passed into the crystalline state), is removed from the crystallizer by conduit 4 while a suspension of crystals in the recycled liquid, and eventually the liquid refrigerant if the latter has not already been separated at the bottom of crystallizer 1, is drained from the column by conduit 5.

The mixture of crystals and the two above-mentioned liquids enter the bottom of the separator 6 which preferably has the form of an inverted truncated cone, widemouthed at the top.

The separator presents at an intermediate region a lateral filter 8 preferably parallel to the generatrices of the truncated cone comprising, for example, perforations in the side walls. In the upper portion of the separator there is a conventional solids discharge system, for example, a rotary blade.

At the bottom of the separator the heavy immiscible refrigerant is decanted and is continuously withdrawn by conduit 7 and delivered to the refrigerator 16. From there, the refrigerant with its temperature lowered sufficiently, is returned to the crystallizer by conduit 3.

The slurry which rises in the separator above the level of the discharge conduit 7 is composed mainly of entrainment liquid to be recycled and crystals. Whereas the liquid to be recycled passes through the filter 8 and is returned to the crystallizer by conduit 9, the crystals accumulate in the separator where they form a permeable bed of solid materials.

This bed moves upward under the buoyancy exerted by the entrainment liquid passing through the lower part of this permeable bed, which entered the separator by conduit 5.

This buoyancy moves the crystals above the level of the filter 8 into the upper portion of the separator from where they are discharged by a classical device, for example by scraper 10, and deposited in a conduit 11 by which they are delivered to a fusion apparatus 13. In this apparatus the crystals are melted. The heavy refrigerant which is eventually entrained by the crystals is decanted from the bottom of the apparatus, or is drained by conduit 15 and returned to the refrigerator 16 to be reused for heat exchange.

The conduit 14 is used for removing the pure product desired. Some of the pure product can be used as a washing or reflux liquid for the crystals. It is then removed by conduit 12 and delivered to the upper part of the separator. This washing liquid flows countercurrent to the bed of crystals and leaves the separator through filter 8 together with the entrainment liquid which has practically the same composition and is delivered by conduit 9 to the bottom of the crystallizer for recycling.

Although the liquids which flow in conduits 2, 4 and 9 are of the same nature, they have been given different names to distinguish them on the basis of their contents of crystallizable component. The solution called "mother liquor" which flows in conduit 4 contains less of the crystallizable component than the solution initially used as the charge which arrived by conduit 2. The recycling liquid arriving by conduit 9 corresponds to a liquid that is richer in the crystallizable component than the charge because it was in contact with the crystals of this compound in the neighborhood of the filter 8 and was in part recycled by conduits 12 and 9 after partial fusion of the crystals.

Figure 2:
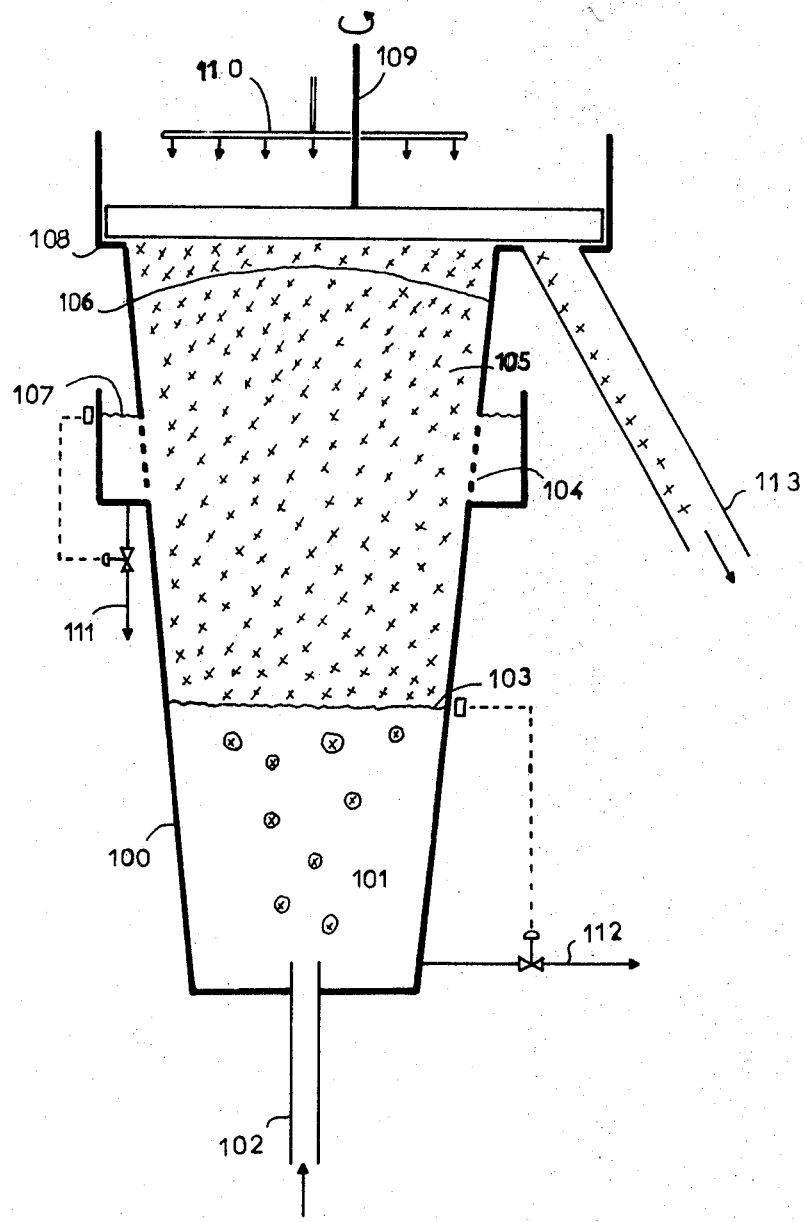

FIG. 2 shows in more details the preferred embodiment of the separator, particularly useful when the crystals formed in the crystallization apparatus are heavier than the entrainment liquid but of lower density than the immiscible liquid.

The separator 100 is a vessel open at the top and having an increasing cross section from the bottom to the top. The lower portion of the vessel contains the immiscible heavy liquid 101 (for example refrigerant) which has been discharged with the slurry of crystals in the entrainment liquid from feed line 102. The immiscible liquid becomes part of the liquid in the lower portion of the separator and the slurry rises by floating forces through the heavy immiscible liquid and adds to the bottom of the crystal-entrainment liquid phase at the top surface 103 of the heavy liquid.

The crystals are retained as part of the bed structure and the entrainment liquid proceeds through the bed structure toward and out through side ports 104. The flow pressure drop between the bottom of the bed and the side ports provides the force to consolidate the bed and to move it in an upwardly direction. The bed expands slightly in cross-section as it moves in the upwardly direction in order to minimise the resistance to movement which exists at the stationary inner part of the walls of the separator.

From the drainage ports to the top of the separator the crystals pass through a washing zone 105. A liquid level 106 is maintained at a chosen level above the drainage ports by setting the back-pressure on these ports. In the example, this is accomplished by controlling the level 107 of liquid in an annulus into which the liquid from the drainage ports discharges.

As the bed reaches the top 108 of the separator it is continuously scraped off by a suitable scraping or cutting device the axis of which is shown as 109, and the crystal mass is discharged through conduit 113. Washing liquid which may be either a portion of the melted overhead product or a liquid which is miscible with the entrainment liquid is provided through a distributor 110.

The exit stream 111 contains the entrainment liquid and the washing liquid which has passed downwardly through the upper portion of the bed and out the drainage ports, and much of the entrained heavy immiscible liquid which may have been carried upwardly by the bed.

The heavy immiscible liquid is withdrawn at the bottom of the separator through conduit 112 in such a manner that the level 103 of the heavy liquid remains constant in the separator, and that the height of the heavy immiscible liquid phase in the separator is at least 0.5 times and preferably from 1 to 20 times the diameter of the separator at the level of delivery of the slurry.

Providing a heavy phase at the bottom of the separator as hereabove defined, prevents the crystals from settling down, accumulating in the bottom of the separator particularly around the feed conduit, and subsequently bringing about a slugging and surging of the bed of crystals.

The process described above in combination with the conditions described below in detail provides important advantages over the classical methods of forming and separating solids.

It is important that the crystals which are formed in the crystallizer 1 be carried along in countercurrent to the mother liquor from which they came, and hence in the same direction as the refrigerant and not in the direction of the mother liquor.

By operating according to the method of this invention, namely by creating a countercurrent between the solution and the crystals, the spent mother liquor which is removed by conduit 4 is from the coldest part of the crystallization zone while the crystals are removed from the warmest part of the zone. In this manner the thermodynamic efficiency of the crystallization process is greatly improved.

The recycling of the washing and transport or entrainment liquids by conduit 9 plays an important role. A portion of these liquids (the entrainment liquid) descends toward the base of column 1 and serves to entrain the crystals toward the separator 6 where they continue toward the top of that apparatus. This portion flowing through conduit 5, separator 6, conduit 9 and the bottom of apparatus 1 can be considered as flowing in a closed circuit.

The other portion of the liquid (the reflux liquid), returns to column 1 where it comes into contact with the refrigerating liquid and the crystals from the point of junction of conduit 9 with column 1 to the top of the latter. The reflux liquid of column 1, mixed with the spent mother liquor, leaves column 1 through conduit 4. It can be stated that the reflux liquid comes from the partial fusion or disolution of the crystals (conduits 12 and 9).

The flow rate of entrainment liquid is easily controlled by classical means, for example, by regulating the recycling by conduit 9 and by regulating the amount of liquid withdrawn by conduit 4.

The flow rate of reflux liquid is equal to the flow rate of recycled liquid (conduit 9) diminished by the flow rate of entrainment liquid (conduit 5).

In practice, for 1 part by weight of crystals formed in zone 1 of countercurrent contact, from 0.1 to 1 part by weight of reflux liquid and 2 to 20 parts by weight of entrainment liquid (conduit 5) are used.

This specific method of transporting the crystals from the crystallizer 1 to the separator 6 eliminates the use of a pump which would crush the crystals and would render the subsequent treatments (washing and fusion) more difficult.

A less desirable variant of this invention consists of filtering through 8 only the entrainment liquid and washing the crystals in a separate apparatus. The used washing liquid is thereafter conducted to the crystallizer 1 by a conduit separate from 9 but entering the crystallizer 1 at a point near where the entrainment liquid is injected (the compositions being, of course, similar).

Another variant consists of using a filter 8 of two stages, the liquid filtered in the upper portion serving as a reflux liquid and the liquid filtered in the lower portion serving as an entrainment liquid.

It is also possible to wash the crystals by a liquid that is different from that which is obtained during the subsequent fusion of the crystals. This is done, for example, when the crystals have a very high melting point. Such a washing liquid is removed in the same manner by conduit 9 and is recovered at the head of the crystallizer by conduit 4. This washing liquid is separated from the spent mother liquor, e.g., by decantation, distillation, etc.

It is also essential that the heavy immiscible refrigerant be decanted at least partly, either in the bottom of the crystallization column 1 or at the base of the separator 6, rather than having it filtered at the same time as the entrainment liquid in the upper part of the separator.

In this manner the amount of liquid passing through the filter is reduced, and furthermore the solid materials accumulating in the separator above the level of withdrawal of the refrigerant are traversed only by the entrainment liquid toward which the solids bed have better permeability. In this manner the entrainment of the refrigerant by the crystals is considerably reduced, the washing of the crystals above the filter 8 is facilitated and hence the purity of the product that is withdrawn by conduit 14 is definitely increased.

The process of the present invention is of very general utility. It can be used whenever it is desired to separate by refrigeration one constituent of a liquid mixture of products, or to purify such products.

The present invention is applicable to the resolution of a vast number of simple binary and complex multi-component mixture systems. Examples of mixtures are combinations of benzene, normal heptane, cyclohexane, methyl-cyclohexane, p-xylene, other xylene isomers and ethyl-benzene.

By immiscible in the present invention is meant any liquid the solubility of which in the mixture is less than 5% and preferably less than 1% by weight.

Specific examples of refrigerants useful with the present invention are: aqueous solutions containing salts of alkaline or alkaline-earth metals such as sodium or potassium chlorides or nitrates, ammonium sulfate or aqueous ammonia solutions, aqueous solutions containing alcohols, ketones or polyols such as glycerol or mixtures of this salts, alcohols and ketones.

The differences in specific gravity between the liquid mixture and the crystalline product will range preferably from 0.03 to 0.20 gram per cubic centimeter.

The method of this invention is applicable not only in cases where the crystals are heavier than the initial solution from which they were produced, but also in converse cases. In the latter cases it is only necessary to choose an immiscible refrigerating liquid which has, like the crystals, a lower density than that of the initial solution. The latter is then introduced by the top of the crystallizer 1 while the refrigerant is introduced at the foot of the crystallization column.

Refrigerant, crystals and entrainment liquid are extracted from the head of the crystallizer 1, and after decantation of the refrigerant, the slurry of crystals in suspension in the liquid of entrainment is delivered to the separator 6. The entrainment liquid and the washing liquid having traversed the filter of the separator, are then delivered to the head of the crystallizer. Except for these minor modifications, the system functions in the same manner as in the first case.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLES

For purposes of illustration, the results of two experimental runs, using the apparatus shown in FIG. 1 with the modification shown in FIG. 2, are given.

A solution composed of p-xylene, o-xylene, m-xylene and ethyl-benzene is supplied to conduit 2 and the p-xylene is then crystallized out by refrigerating the solution by direct thermal exchange in countercurrent relation with an aqueous saline solution. The crystals are then separated in the separator 6 and melted in the apparatus 13.

The following Tables I and II illustrate for each conduit, as indicated by its number on the drawing, the nature, composition, temperature and the yield of the material circulating therein.

TABLE I

| Nature of the liquid | Conduit No. | Yield kg./hr. | p-Xylene percent by wt. | Temp., °C. |
|---|---|---|---|---|
| Organic liquids: | | | | |
| Feed | 2 | 37.5 | 73 | +7 |
| Mother liquor | 4 | 18.5 | 46 | −12 |
| Recycling liquid | 9 | 74 | 82 | +8 |
| Entrainment liquid | 5 | 63 | 82 | +3 |
| Entrained crystals | 5 | 30 | 93 | +3 |
| Washing liquid | 12 | 13 | 99 | +11 |
| Washed crystals | 11 | 32 | 99 | +10 |
| p-Xylene | 14 | 19 | 99 | +14 |
| Liquid refrigerant, brine: | | | | |
| Entering crystallizer | 3 | 125 | 0 | −20 |
| Leaving separator | 7 | 110 | 0 | +2 |
| Leaving filter | 9 | 10 | 0 | +8 |
| Leaving purifier | 15 | 5 | 0 | +14 |

TABLE II

| | Conduit No. | Yield kg./hr. | p-Xylene percent by wt. |
|---|---|---|---|
| Nature of the liquid: | | | |
| Feed | 2 | 40 | 68 |
| Mother liquor | 4 | 15 | 16 |
| Recycling liquid | 9 | 70 | 80 |
| Entrainment liquid | 5 | 65 | 80 |
| Entrained crystals | 5 | 30 | 96 |
| Washing liquid | 12 | 10 | 99 |
| Washed crystals | 11 | 35 | 99 |
| p-Xylene | 14 | 25 | 99 |

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

We claim:

1. In a process for selectively crystallizing one of the constituents of a liquid mixture, comprising introducing said mixture into a crystallization zone, forming a continuous phase of said mixture in said zone, introducing into said zone an immiscible liquid refrigerant in dispersed form in direct countercurrent relation to said continuous phase to form crystalline product, passing the formed crystalline product away from said crystallization zone in the same direction as and in admixture with said immiscible liquid refrigerant and separating said immiscible liquid refrigerant from said crystalline product in a zone remote from said crystallization zone, the improvement comprising the further steps of introducing an entrainment liquid in the crystallization zone at a point intermediate the point of introduction of said liquid mixture into said crystallization zone and the point where said formed crystalline product is passed away from said crystallization zone, said entrainment liquid being formed of the same constituents as those of the initial mixture but in a higher concentration of the crystallizable product withdrawn from said crystallization zone, a mixture comprising crystallizable product and entrainment liquid, and separating said entrainment liquid from the crystalline product.

2. The process of claim 1, further comprising recycling resultant separated entrainment liquid to said crystallization zone.

3. The process of claim 1, wherein said crystalline product is in countercurrent flow with said liquid mixture.

4. The process of claim 1, further comprising washing said crystalline product with a reflux liquid and recirculating a portion of said reflux liquid in cocurrent flow with said crystalline product.

5. The process of claim 4, wherein said reflux liquid is obtained by melting a portion of said crystalline product.

6. The process of claim 1, wherein said liquid mixture is an organic solution and said immiscible liquid refrigerant is brine.

7. The process of claim 1, wherein said organic solution is a mixture of xylenes and ethyl-benzene, and p-xylene is said crystalline product.

8. A process as defined by claim 1 wherein said crystallization zone is vertical and elongated, said immiscible refrigerant is introduced at the top part of said zone, and said crystallizable mixture is introduced at a part below said top part.

9. Process of selective crystallization and separation of one constituent of a liquid mixture of substances comprising introducing said mixture into an elongated and substantially vertical crystallization zone having a first and a second end, at a point intermediate between said ends, whereby said liquid mixture forms a continuous phase in said zone, introducing at said first end an immiscible refrigerant liquid which flows in dispersed form toward said second end in countercurrent relation to said continuous phase whereby partial crystallization of said liquid mixture takes place, and the crystals formed flow in the same direction as the immiscible refrigerant toward said second end and in countercurrent relation to a reflux liquid as defined hereafter, withdrawing the spent continuous phase at the first end separating by decantation the immiscible refrigerant from said crystals in suspension in an entrainment liquid formed of the same constituents as those of the initial mixture, but in a higher concentration of the crystallizable compound, said entrainment liquid being introduced in the crystallization zone at a point intermediate between the second end and the point where the initial mixture is introduced, carrying the crystals in said entrainment liquid from the second end of the crystallization zone to a separation zone, filtering said entrainment liquid in said separation zone, returning said filtered entrainment liquid to the crystallization zone, washing the crystals by a washing liquid in countercurrent relation, carrying the used washing liquid to the crystallization zone where it is introduced at the same point as the entrainment liquid or at a point between the latter point and the feed point for the mixture, said washing liquid, constituting said reflux liquid and collecting the separated and washed crystals of the desired constituent.

References Cited
UNITED STATES PATENTS

| | | | |
|---|---|---|---|
| 2,764,488 | 9/1956 | Slattery | 62—58 |
| 3,079,761 | 3/1963 | Toulmin, Jr. | 62—58 |
| 3,269,136 | 8/1966 | Unand | 62—58 |
| 3,350,296 | 10/1967 | Torobin | 62—58 |
| 3,368,362 | 2/1968 | Smith | 62—58 |
| 2,769,852 | 11/1956 | Paulson | 62—58 UX |
| 3,017,751 | 1/1962 | Hawkins | 62—58 |
| 3,119,772 | 1/1964 | Hess | 62—58 XR |
| 3,126,334 | 3/1964 | Harlow | 62—58 XR |
| 3,180,102 | 4/1965 | Torobin | 62—58 |
| 3,243,968 | 4/1966 | McKay | 62—58 |
| 3,250,081 | 5/1966 | Othmer | 62—58 |
| 3,303,121 | 2/1967 | Li et al. | 62—58 XR |
| 3,327,492 | 6/1967 | Goard et al. | 62—58 |

FOREIGN PATENTS

| | | |
|---|---|---|
| 217,766 | 3/1958 | Australia. |

NORMAN YUDKOFF, Primary Examiner

U.S. Cl. X.R.

260—707, 674